United States Patent
Rockstroh et al.

(10) Patent No.: US 10,195,692 B2
(45) Date of Patent: Feb. 5, 2019

(54) PARALLEL DIRECT METAL LASER MELTING

(71) Applicant: General Electric Company, Schenectady, NY (US)

(72) Inventors: Todd Jay Rockstroh, Maineville, OH (US); Daniel Curtis Gray, Niskayuna, NY (US); Mark Allen Cheverton, Mechanicville, NY (US); Victor Petrovich Ostroverkhov, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 11 days.

(21) Appl. No.: 15/318,088

(22) PCT Filed: May 20, 2015

(86) PCT No.: PCT/US2015/031659
§ 371 (c)(1),
(2) Date: Dec. 12, 2016

(87) PCT Pub. No.: WO2015/191257
PCT Pub. Date: Dec. 17, 2015

(65) Prior Publication Data
US 2017/0113303 A1    Apr. 27, 2017

Related U.S. Application Data

(60) Provisional application No. 62/011,225, filed on Jun. 12, 2014.

(51) Int. Cl.
| | |
|---|---|
| *B23K 26/34* | (2014.01) |
| *B23K 26/342* | (2014.01) |
| *B22F 3/105* | (2006.01) |
| *B33Y 10/00* | (2015.01) |
| *B33Y 30/00* | (2015.01) |

(Continued)

(52) U.S. Cl.
CPC .......... *B23K 26/342* (2015.10); *B22F 3/1055* (2013.01); *B23K 26/0648* (2013.01);
(Continued)

(58) Field of Classification Search
CPC ........................................ B23K 26/34–26/342
(Continued)

(56) References Cited

U.S. PATENT DOCUMENTS

| | | |
|---|---|---|
| 2003/0052105 A1 | 3/2003 | Nagano et al. |
| 2003/0214571 A1 | 11/2003 | Ishikawa et al. |

(Continued)

FOREIGN PATENT DOCUMENTS

| | | |
|---|---|---|
| CN | 102266942 A | 12/2011 |
| DE | 102005014483 A1 | 10/2006 |

(Continued)

OTHER PUBLICATIONS

PCT Search Report and Written Opinion issued in connection with corresponding PCT Application No. PCT/US2015/031659 dated Aug. 26, 2015.

*Primary Examiner* — Michael Laflame, Jr.
(74) *Attorney, Agent, or Firm* — General Electric Company; Brian Overbeck

(57) ABSTRACT

A method of creating an article of manufacture is provided, which includes directing multiple laser beams to a single galvanometer; and dynamically repositioning the multiple laser beams in counterpart paths using the single galvanometer to shine the multiple laser beams on and melt a first powder material and, upon solidification of the melted first powder material, forming a first series of duplicate three dimensional structures, where each of the multiple laser beams is used to form at least one of the first series of duplicate three dimensional structures.

48 Claims, 4 Drawing Sheets

(51) Int. Cl.
*B33Y 40/00* (2015.01)
*B23K 26/70* (2014.01)
*B23K 26/06* (2014.01)
*B23K 26/067* (2006.01)
*B23K 26/08* (2014.01)
*B29C 64/153* (2017.01)

(52) U.S. Cl.
CPC ........ *B23K 26/0676* (2013.01); *B23K 26/083* (2013.01); *B23K 26/705* (2015.10); *B29C 64/153* (2017.08); *B33Y 10/00* (2014.12); *B33Y 30/00* (2014.12); *B33Y 40/00* (2014.12); *B22F 2003/1056* (2013.01); *Y02P 10/295* (2015.11)

(58) Field of Classification Search
USPC ............................ 219/121.6–121.61, 121.65, 219/121.76–121.77, 149, 162
See application file for complete search history.

(56) References Cited

U.S. PATENT DOCUMENTS

| | | | |
|---|---|---|---|
| 2005/0263932 | A1 | 12/2005 | Heugel |
| 2010/0316071 | A1* | 12/2010 | Kimberlin .......... G02B 27/1006 372/17 |
| 2013/0056910 | A1 | 3/2013 | Houbertz-Krauss et al. |
| 2013/0108726 | A1* | 5/2013 | Uckelmann ......... B29C 67/0007 425/174.4 |
| 2013/0112672 | A1 | 5/2013 | Keremes et al. |
| 2013/0270240 | A1* | 10/2013 | Kondo ............... B23K 26/0066 219/121.79 |
| 2014/0271328 | A1* | 9/2014 | Burris ................. B23K 26/034 419/53 |

FOREIGN PATENT DOCUMENTS

| | | |
|---|---|---|
| GB | 2440727 A | 2/2008 |
| JP | 63145015 A | 6/1988 |

* cited by examiner

PARALLEL DIRECT METAL LASER MELTING

CROSS-REFERENCE TO RELATED DOCUMENTS

The present application is a national stage application under 35 U.S.C. § 371(c) of prior filed PCT application serial number PCT/US2015/031659, filed on 20 May 2015, which claims priority to U.S. Provisional Patent Application Ser. No. 62/011,225 titled "PARALLEL DIRECT METAL LASER MELTING" filed on 12 Jun. 2014, the disclosures of which are incorporated by reference herein.

TECHNICAL FIELD

The present disclosure is directed to additive manufacturing and, more specifically, to devices, systems, methods, and structures resulting from using the foregoing, that relate to simultaneous fabrication of multiple structures using a single set of build instructions.

BACKGROUND

Referring to FIG. 1, a schematic representation is depicted of a commercially available direct laser metal sintering machine 100. Those skilled in the art are familiar with direct laser metal sintering and the general process of using a laser beam to melt a solid, powdered metal to ultimately form continuous metal layer slices that are fused together sequentially to form a three dimensional object. Consequently, only a low level description of the components of a direct laser metal sintering machine and the process carried out by these contemporary components is provided in furtherance of brevity.

This direct laser metal sintering machine 100 includes a chamber delineated by walls (not shown) within which the selective sintering process takes place. As used herein, sintering refers to melting of solid particles in furtherance of approaching or reaching near full density upon solidification of the melted particles. This chamber includes a working area 102 and a reservoir area 104 that are partially separated by a divider wall 106. On one side of the divider wall 106 in the working area 102 is a build piston 110 that vertically repositions a build platform 112, upon which resides a metal powder bed 116 and a sintered part 118. On the other side of the divider wall 106 in the reservoir area 104 is a metal powder dispenser piston 120 that vertically repositions a metal powder dispenser platform 122, upon which resides a reservoir of metal powder 126 that provides replenishing metal powder to the working area 102 during the sintering process.

In order to carry out the sintering process, the machine 100 includes a laser 130 that generates a laser beam 134. This laser beam is directed through a set of optics/lenses 132 prior to reaching a galvanometer 136. The galvanometer includes a controller and motor connected to one or more mirrors operative to reposition the laser beam 134 across the metal powder bed 116 to change the two dimensional position of the laser beam with respect to the metal powder bed.

In summary fashion, a master controller (not shown) of the machine 100 is responsible to control of the overall sintering process. In particular, the master controller controls the operation of the laser 130 to selectively power it on or off in order to provide or discontinue the laser beam 134. Moreover, the master controller is communicatively coupled to the galvanometer 136 in order to change the two dimensional position of the laser beam 134 upon the metal powder bed 116 and form a sintered metal layer 140 (e.g., one of the sintered metal layer slices of the eventual fabricated device). In exemplary form, the laser beam 134 may be scanned across the metal powder bed 116 in straight line in an X-direction, followed by an incremental shift in the Y-direction, followed by another scan across the metal powder bed in a straight line in the X-direction, with this process repeating until the laser beam has been moved across the working dimensions of the powder bed 116. Those skilled in the art are familiar with the controls necessary to scan a laser beam in two dimensions to form a sintered metal layer 140, accordingly, a more detailed recitation of this process has been omitted in furtherance of brevity.

After concluding the scanning of the laser beam 134, the sintered metal layer 140 is moved vertically downward by repositioning the build piston 110, which in turn vertically repositions the build platform 112 downward upon which the sintered metal layer sits. Also, the metal powder bed 116 is reset using a coater arm 144 that is operative to spread evenly a layer of powdered metal from the reservoir 126 across the cross-sectional area of the build platform 112 (including the metal layer 140) prior to carrying out the next laser scanning operation. Thereafter, the laser beam 134 is scanned across at least a portion of the cross-sectional area of the build platform 112 to form a subsequent sintered metal layer this is fused to the preceding sintered metal layer. This sequence of events (i.e., laser scanning and powdered metal layer reset) is repeated until the last sintered metal layer is formed, thereby signifying completion of the three dimensional object.

As depicted in FIG. 1, pre-existing additive manufacturing machines were limited by utilizing a single laser beam to sinter a powdered material. In cases where multiple products were manufactured within a single powder bed, this single laser needed to be repositioned by the galvanometer redundantly across the powder bed, which unnecessarily required additional time and resources. Conversely, it is more common to operate two or more additive manufacturing machines in parallel to each create a single duplicate device. But this requires rather large outlays of additional capital to purchase and maintain redundant additive manufacturing machines, to purchase and maintain duplicative powder reservoirs, and to tie up a single machine to only make a single device. Accordingly, there is a need to increase the efficiency of additive manufacturing machines to create multiple devices concurrently, without requiring the laser to scan across more of the powder bed than is necessary to sequentially fabricate the layers of a single device.

BRIEF DESCRIPTION

The instant disclosure includes a method of creating an article of manufacture, the method comprising: (a) directing multiple laser beams to a single galvanometer; and, (b) dynamically repositioning the multiple laser beams in counterpart paths using the single galvanometer to shine the multiple laser beams on and melt a first powder material and, upon solidification of the melted first powder material, forming a first series of duplicate three dimensional structures, where each of the multiple laser beams is used to form at least one of the first series of duplicate three dimensional structures.

DETAILED DESCRIPTION

Figure 1:
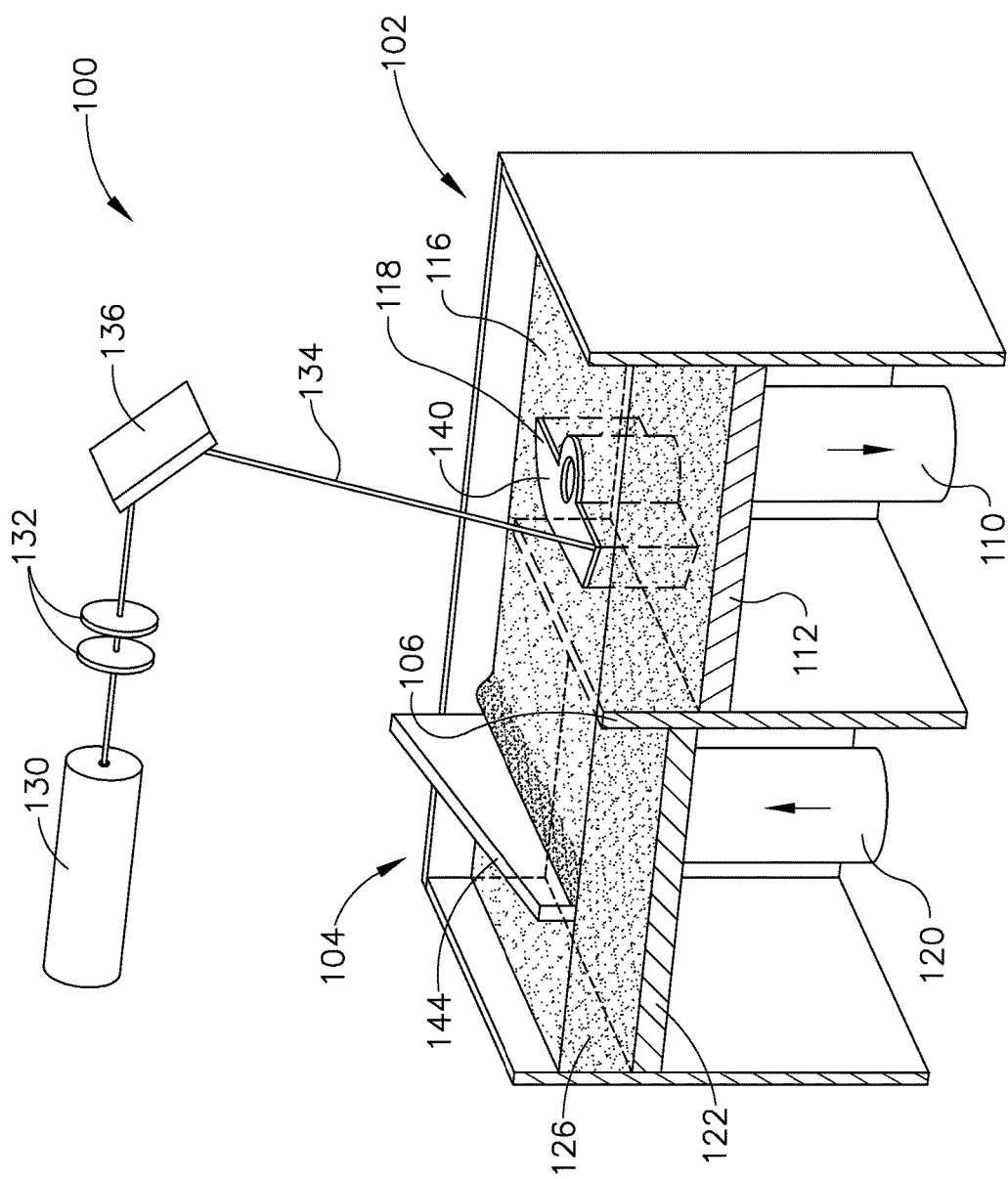
FIG. 1 is a schematic diagram of a preexisting additive manufacturing machine's primary hardware components.

It should be understood that the following detailed description of embodiments of the present disclosure are exemplary in nature and are not intended to constitute limitations upon the present disclosure. It is also to be understood that variations of the exemplary embodiments contemplated by one of ordinary skill in the art shall concurrently fall within the scope and spirit of the disclosure.

It is a first aspect of the present disclosure to provide a method of creating an article of manufacture, the method comprising: (a) directing multiple laser beams to a single galvanometer; (b) controlling the single galvanometer to concurrently and proportionally reposition each of the laser beams to a different location within a container housing a first powder material to melt at least a portion of the first powder material; (c) applying additional first powder material to a location where the first powder material was previously melted; (d) controlling the single galvanometer to concurrently and proportionally reposition each of the laser beams to a different location within the container housing the additional first powder material to melt at least a portion of the additional first powder material; (e) repeating steps (c) and (d) sequentially to form multiple copies of a three dimensional object.

In a more detailed embodiment of the first aspect, the act of directing multiple laser beams to the single galvanometer includes splitting a primary laser beam into the multiple laser beams. In a further detailed embodiment of the first aspect, splitting of the laser beam includes creating the multiple laser beams that each has the same power. In yet another more detailed embodiment, the laser beam comprises a 1000 Watt or greater laser beam prior to being split into the multiple laser beams. In a further detailed embodiment, the laser beam is generated by a solid state laser. In still a further detailed embodiment, the laser beam generated by the solid state laser is transmitted via a fiber optic. In a more detailed embodiment, delivering each of the multiple laser beams to the single galvanometer includes laterally and axially offsetting the multiple laser beams prior to reaching the single galvanometer. In a more detailed embodiment, delivering each of the multiple laser beams to the single galvanometer includes expanding each of the multiple laser beams prior to reaching the single galvanometer. In another more detailed embodiment, delivering each of the multiple laser beams to the single galvanometer includes automatically dynamically focusing each of the two or more sub-beams prior to reaching the single galvanometer. In yet another more detailed embodiment, the step of controlling the single galvanometer includes concurrently and proportionally dynamically repositioning each of the multiple laser beams within a two-dimensional coordinate system to melt powder material to form duplicate solid slices for each copy of the three dimensional object. In still another more detailed embodiment, the step of applying additional powder material includes applying a layer of additional powder material to locations where the powder material was immediately prior melted.

It is a second aspect of the present disclosure to provide a method of creating an article of manufacture, the method comprising: (a) directing multiple laser beams to a single galvanometer; (b) controlling the single galvanometer to concurrently and proportionally dynamically reposition each of the multiple laser beams within an X-Y coordinate system to shine on and melt a first powder material on a working surface to ultimately create a first solid slice of a three dimensional object, where each of the multiple laser beams is operative to create a duplicate of the first solid slice; (c) applying additional first powder material to each first solid slice; (d) controlling the single galvanometer to concurrently and proportionally dynamically reposition each of the multiple laser beams within the X-Y coordinate system to shine on and melt at least a portion of the additional first powder material to create a further solid slice of the three dimensional object that is attached to the first solid slice, where each of the multiple laser beams is operative to create a duplicate of the further solid slice; (e) applying additional first powder material to the further solid slice; (f) controlling the single galvanometer to concurrently and proportionally dynamically reposition each of the multiple laser beams within the X-Y coordinate system to shine on and melt at least a portion of the additional first powder material to create another solid slice of the three dimensional object that is attached to a preceding solid slice, where each of the multiple laser beams is operative to create a duplicate of the another solid slice; and, (g) repeating steps (e) and (f) sequentially to form the three dimensional object, where each of the multiple laser beams is operative to create a duplicate of the three dimensional object when all solid surfaces of the three dimensional object have been completed.

In a more detailed embodiment of the second aspect, the act of directing multiple laser beams to the single galvanometer includes splitting a primary laser beam into the multiple laser beams. In a further detailed embodiment of the second aspect, splitting of the laser beam includes creating multiple laser beams that each has the same power. In yet another more detailed embodiment, the laser beam comprises a 1000 Watt or greater laser beam prior to being split into the multiple laser beams. In a further detailed embodiment, the laser beam is generated by a solid state laser. In still a further detailed embodiment, the laser beam generated by the solid state laser is transmitted via a fiber optic. In a more detailed embodiment, delivering each of multiple laser beams to the single galvanometer includes laterally and axially offsetting the multiple laser beams prior to reaching the single galvanometer. In a more detailed embodiment, delivering each of the multiple laser beams to the single galvanometer includes expanding each of the multiple laser beams prior to reaching the single galvanometer. In another more detailed embodiment, delivering each of the multiple laser beams to the single galvanometer includes automatically dynamically focusing each of the t multiple laser beams prior to reaching the single galvanometer. In yet another more detailed embodiment, the step (c) also includes solidification of the melted powder material after the multiple laser beams no longer shine on the melted powder material, where the solidified material forms the first solid slice, and the step (e) also includes solidification of the melted additional powder material after the multiple laser beams no longer shine on the melted additional powder material, where the solidified additional material forms the further solid slice. In still another more detailed embodiment, the step (f) includes applying a layer of additional powder material to the further solid slice.

It is a third aspect of the present disclosure to provide a method of creating an article of manufacture, the method comprising: (a) directing multiple laser beams to a single galvanometer; (b) concurrently and proportionally dynamically repositioning the multiple laser beams using a single galvanometer to melt a first powder material in duplicate patterns of a first slice of a three dimensional object, where each of the multiple laser beams is responsible for at least one of the duplicate patterns; (c) solidification of the melted powder material to form a plurality of first solid slices that are duplicates of one another; (d) delivering additional first powder material on top of the plurality of first solid slices; (e) concurrently and proportionally dynamically repositioning each of the multiple laser beams using the single galvanometer to melt at least a portion of the additional first powder material in duplicate patterns of a further slice of the three dimensional object, where each of the multiple laser beams is responsible for at least one of the duplicate patterns; (f) solidification of the melted additional first powder material to form a plurality of further solid slices that are duplicates of one another; and, (g) repeating steps (d) through (f), sequentially, unless the plurality of further solid slices represent a final slice of the three dimensional object.

In a more detailed embodiment of the third aspect, dividing of the laser beam includes creating multiple laser beams that each has the same power. In yet another more detailed embodiment, the laser beam comprises a 1000 Watt or greater laser beam prior to being divided into the multiple laser beams. In a further detailed embodiment, the laser beam is generated by a solid state laser. In still a further detailed embodiment, the laser beam generated by the solid state laser is transmitted via a fiber optic. In a more detailed embodiment, the method further includes delivering each of the multiple laser beams to the single galvanometer by laterally and axially offsetting the multiple laser beams prior to reaching the single galvanometer. In a more detailed embodiment, delivering each of the multiple laser beams to the single galvanometer includes expanding each of the multiple laser beams prior to reaching the single galvanometer. In another more detailed embodiment, delivering each of the multiple laser beams to the single galvanometer includes automatically dynamically focusing each of the multiple laser beams prior to reaching the single galvanometer.

It is a fourth aspect of the present disclosure to provide a method of creating an article of manufacture, the method comprising: (a) directing multiple laser beams to a single galvanometer; and, (b) dynamically repositioning the multiple laser beams in counterpart paths using the single galvanometer to shine the multiple laser beams on and melt a first powder material and, upon solidification of the melted first powder material, forming a first series of duplicate three dimensional structures, where each of the multiple laser beams is used to form at least one of the first series of duplicate three dimensional structures.

In a more detailed embodiment of the fourth aspect, the act of directing multiple laser beams to the single galvanometer includes dividing a primary laser beam into the multiple laser beams. In a further detailed embodiment of the fourth aspect, the method further includes repeating step (b) to form a series of three dimensional structures mounted to one another to form multiple, separate three dimensional end products, where each multiple laser beam is used to create one of the multiple, separate three dimensional structures. In yet another more detailed embodiment, the method further includes the step of delivering additional powder material to the duplicate three dimensional structures prior to repeating step (b). In a further detailed embodiment, the powder material is housed in separate containers, one for each of the number of multiple laser beams. In still a further detailed embodiment, the powder material is housed in separate containers, one for each of the number of multiple laser beams. In a more detailed embodiment, dividing of the laser beam includes creating multiple laser beams that each has the same power. In a more detailed embodiment, the laser beam comprises a 1000 Watt or greater laser beam prior to being divided into the multiple laser beams.

In yet another more detailed embodiment of the fourth aspect, the laser beam is generated by a solid state laser. In yet another more detailed embodiment, the laser beam generated by the solid state laser is transmitted via a fiber optic. In a further detailed embodiment, the method further includes delivering each of the multiple laser beams to the single galvanometer by laterally and axially offsetting the lower power laser beams prior to reaching the single galvanometer. In still a further detailed embodiment, delivering each of the multiple laser beams to the single galvanometer includes expanding each of the multiple laser beams prior to reaching the single galvanometer. In a more detailed embodiment, delivering each of the multiple laser beams to the single galvanometer includes automatically dynamically focusing each of the multiple laser beams prior to reaching the single galvanometer.

It is a fifth aspect of the present disclosure to provide an additive manufacturing machine comprising: (a) a laser; (b) a beam splitter; (c) a master controller; (d) a plurality of automatic dynamic focusing units that include a plurality of F-Theta lenses; (e) a single two dimensional galvanometer; (f) a powder bed; and, (g) a repositionable build platform.

It is a sixth aspect of the present disclosure to provide an additive manufacturing machine comprising: (a) a laser; (b) a master controller; (c) a plurality of automatic dynamic focusing units; (d) a single three dimensional galvanometer; (e) a powder bed; and, (f) a repositionable build platform.

Figure 2:
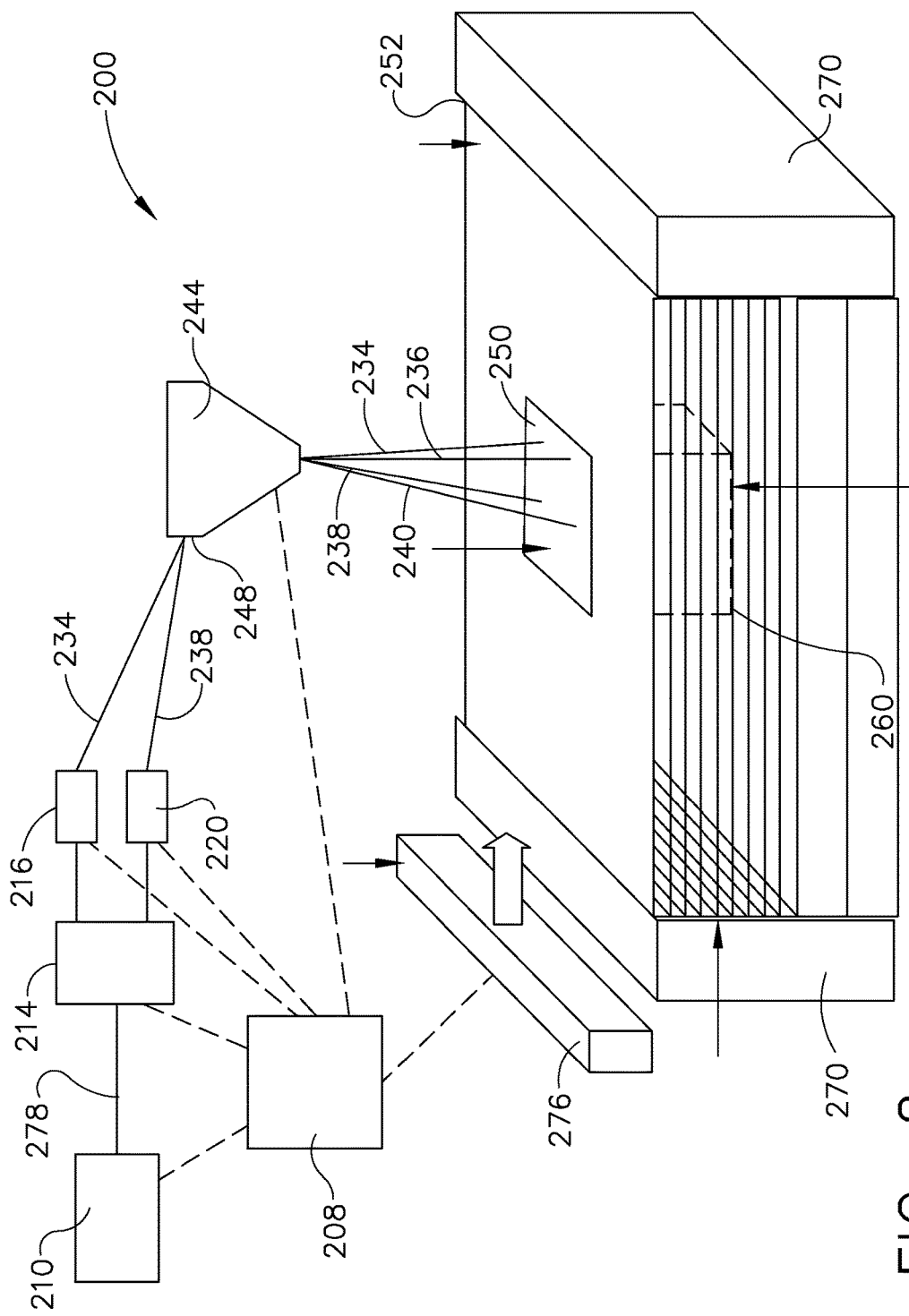
FIG. 2 is a schematic diagram of an additive manufacturing machine in accordance with the instant disclosure.
Figure 3:
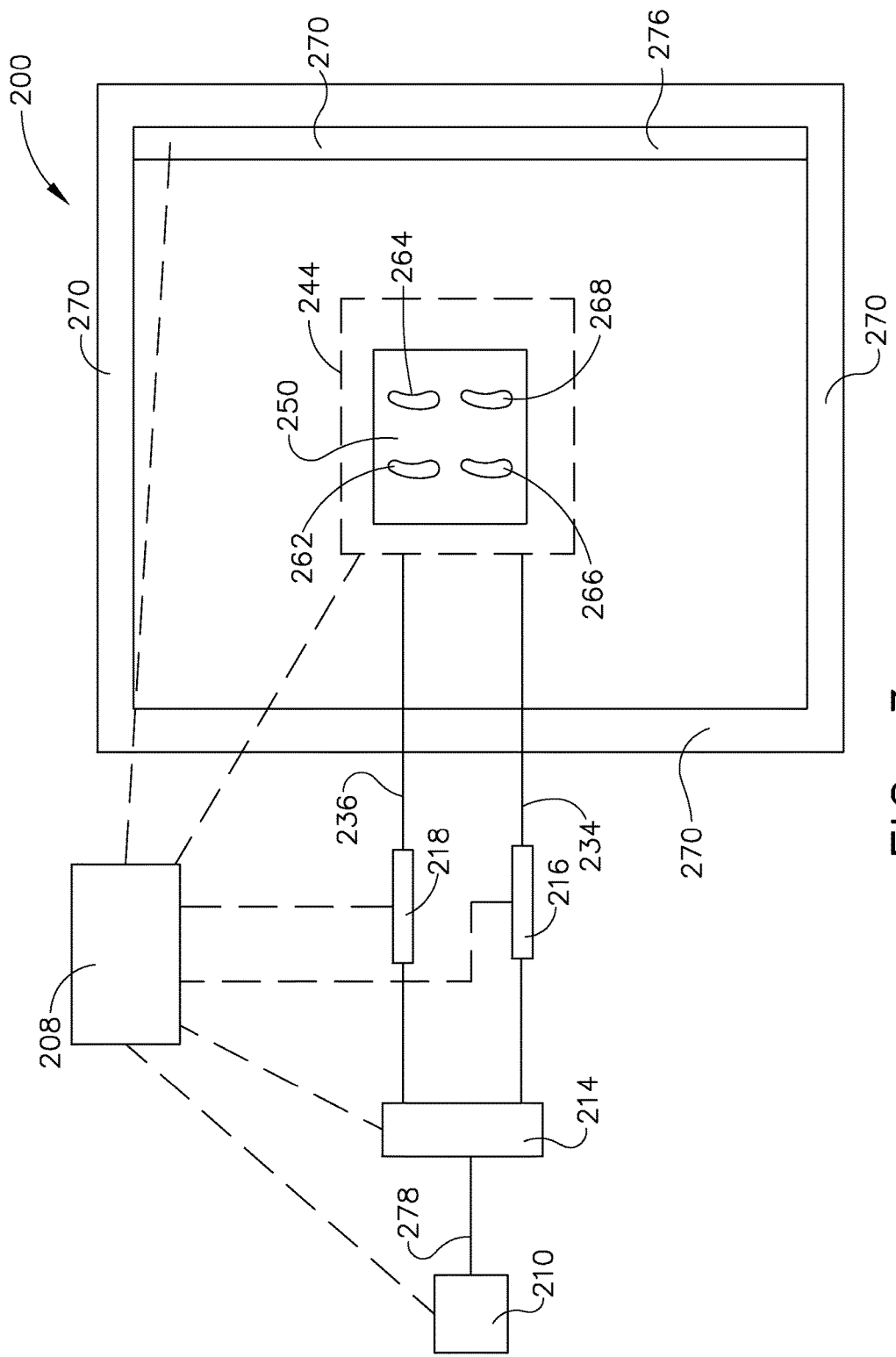
FIG. 3 is a top view of the schematic diagram of FIG. 2.

Referencing FIGS. 2 and 3, a first exemplary diagram of an additive manufacturing machine 200 includes a master controller 208, a laser 210, a beam splitter 214, a series of automatic dynamic focusing units 216-222 that cooperate to direct four distinct laser beams 234-240 to a single galvanometer 244. The galvanometer 244 is operative to redirect concurrently the four laser beams 234-240 onto a powder bed 250 to melt the powder in a desired two dimensional pattern that comprises a slice of an end device, where multiple identical slices 262-268 are fabricated concurrently.

In exemplary form, the powdered bed 250 is established within a powdered bed container 252 that includes a product platform 260 that is vertically repositioned by a product piston (not shown) with respect to surrounding vertical walls 270. In other words, the powdered bed 250 occupies an open cavity delineated by four rectangular vertical walls 270 and the product platform 260. By way of example, the powdered bed 250 occupies a rectangular horizontal cross-section having a depth that is determined by the elevation of the product platform 260. It should be noted, however, that the powdered bed 250 may occupy different cavities having cross-sections other than rectangular, such as circular or oblong to name a few. A powder depositor and leveler 276 is operative to deliver powder from an on-board reservoir and spread the powder evenly across the cross-section of the platform 260.

Turning now to a more detailed description of the components of the machine 200, in this exemplary embodiment, the laser 210 may comprise a single mode, one kilowatt direct diode laser, commonly referred to as the DLR Series, available from IPG Photonics of Oxford, Mass., United States of America. Alternatively, the laser 210 may comprise the LFS 150 fiber laser available from Rofin-Lasag AG of Thun, Switzerland. It is also within the scope of the disclosure to utilize lasers having power outputs above and below one kilowatt. For example, exemplary lasers in accordance with the instant disclosure also include the continuous wave and pulsed thulium fiber lasers available from IPG Photonics and the KLS solid state laser available from Rofin-Lasag AG. Moreover, the laser beam emanating from the laser 210 may be directed to the beam splitter 214 via one or more fiber optic cables 278.

As referenced previously, downstream from the laser 210 is a beam splitter 214 that is operative to parse the single laser beam output from the laser 210 into two or more lesser power laser beams. Exemplary beam splitters 214 or optical switches that may be used in accordance with the instant disclosure include, without limitation, optical switches available from Rofin-Lasag and beam splitters available from IPG Photonics. By way of example, the beam splitter 214 comprises a one-to-four splitter that is operative to utilize a single laser beam input and generate four separate, lower powered laser beam outputs. In exemplary form, presuming the laser 210 is operative to generate a one kilowatt laser beam output, the beam splitter 214 is configured to parse this single one kilowatt laser beam into four two hundred and fifty watt laser beams. Each of these two hundred and fifty watt laser beams is directed to a separate one of the automatic dynamic focusing units 216-222.

In exemplary form, each automatic dynamic focusing unit 216-222 may include a varioSCAN that accommodates for dynamic changes in the image field size, working distance, and spot size. These changes, in part, may be observed as a result of the distance between the galvanometer and the top surface of the powder bed where the laser beam is directed dynamically changing as the laser beam is scanned across the powder bed. In addition, the automatic dynamic focusing unit 216-222 may include an F-Theta scanning lens in series with the varioSCAN. Exemplary dynamic focusing unit components include, without limitation, the varioSCAN family, which is commercially available from Scanlab AG of Munich, Germany, as well as the F-Theta lenses, which are commercially available from Edmund Optics Inc., Barrington, N.J., United States of America. It should also be noted that in instances where a three-dimensional galvanometer is utilized, one may omit the F-Theta lens. As introduced previously, the output laser beam from each automatic dynamic focusing unit 216-222 is directed to the single galvanometer 244.

By way of example, the single galvanometer 244 is controlled by the master controller 208 of the machine 200 to concurrently and dynamically direct the laser beams coming from the automatic dynamic focusing units 216-222 onto the powder bed 250. Exemplary galvanometers for use with the instant disclosure include, without limitation, the 8360K galvanometer available from Cambridge Technology, Inc. of Bedford, Mass., United States of America, as well as the dynAXIS galvanometers available from Scanlab AG of Munich, Germany. In lieu of the former two dimensional galvanometer 244, one may utilize a three-dimensional galvanometer. In such an instance, the additive manufacturing machine 200 may omit the F-Theta lens from the automatic dynamic focusing unit 216-222.

In exemplary form, the outputs from the automatic dynamic focusing units 216-222 are angled differently (i.e., offset from one another so that the laser beams are not coaxial) from one another within a two-dimensional plane or within a three-dimensional space, but nonetheless enter the galvanometer through a single entrance pupil. By angling the output laser beams from each automatic dynamic focusing unit 216-222 differently, but converging the laser beams output from the automatic dynamic focusing units at the entrance pupil of the galvanometer 244, the movement of the galvanometer concurrently repositions the beams to different areas of the powdered bed 250 in concert as a result of the angular offset coming into the galvanometer. In other words, the angular offset of the laser beams entering the galvanometer is maintained when the laser beams exit the galvanometer so that the laser beams are offset from one another and concurrently focus on different portions of the powder bed 250. Consequently, when the galvanometer 244 is programmed to reposition a single laser beam in a predetermined pattern across a portion of the powder bed 250 to create a single sintered device, one can utilize the programmed movement of the galvanometer to reposition multiple angularly offset laser beams across different areas of the powder bed 250 simply by angularly offsetting the beams that are input to the galvanometer entrance pupil. In this manner, the galvanometer can be programmed to quickly reposition a laser within a subset area of the powder bed 250, while using angular offset of the multiple laser beams to direct these other laser beams to differing areas of the powder bed and form duplicate sintered devices. Consequently, one is able to form duplicate sintered patterns upon the powder bed 250 by programming and controlling the galvanometer to carry out a single movement pattern across a fraction of the powdered bed, which reduces costs by eliminating separate galvanometers for each laser beam and reduces time from having the galvanometer reposition a single laser across the entire powdered bed to form sequential sintered devices.

Exemplary powder bed containers 252 are available from various commercial suppliers including, without limitation, the SLM 500 HL from SLM Solutions Group AG of Lubeck, Germany, the M400 from EOS of North America of Novi, Mich., United States of America, and the M2 LaserCusing machine from Concept Laser GmbH of Lichtenfels, Germany.

Figure 4:
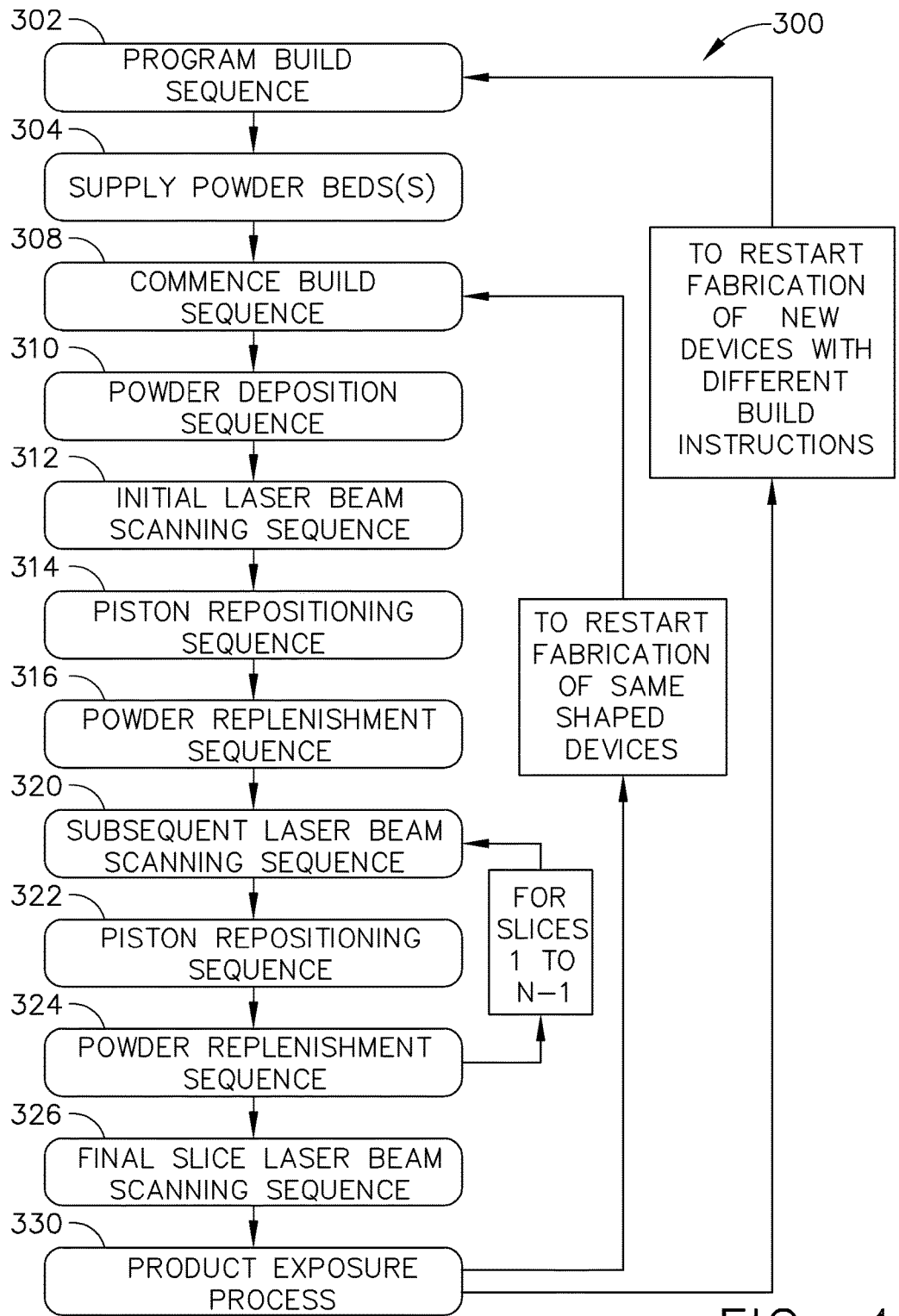
FIG. 4 is a process flow diagram in accordance with the instant disclosure.

Referring to FIGS. 2-4, an exemplary build sequence will be discussed in more detail. Initially, the desired device to be fabricated by sintering of a powder material is divided into a series of two dimensional slices taken along a common axis. These slices are then programmed into the master control 208 in the form of directions indicating when the laser beam 234-240 is to be applied to the powder bed 250, where the laser beam is applied to the powder bed, and the duration the laser beam is applied to a particular spot on the powder bed. Those skilled in the art are familiar with the languages and code necessary to program and control a laser beam 234-240 and galvanometer 244 in order to sinter a powder material to sequentially form a three dimensional object. Accordingly, a detailed recitation of languages and code necessary to program and control the laser beam and galvanometer has been omitted in furtherance of brevity.

In exemplary form, the additive manufacturing techniques discussed herein involve sintering of a powder material in order to melt the powder material in selective locations of a powder bed 250 so that when the melted material solidifies it fuses with other melted material to form a solid slice that fuses to a preceding solid slice and a subsequent solid slice (except in the case of the initial slice and final slice) to eventually form the desired three dimensional device. This additive manufacturing technique and the teachings provided herein are applicable to various powder materials including, without limitation, plastics, ceramics, metals, metal alloys, and alloys of the foregoing. By way of example, the following exemplary process sequence 300 will be described for fabricating a turbine blade from a titanium alloy powder material, but it should be understood that other devices may be fabricated using the techniques disclosed herein, as well as other powder materials may be used to fabricate various devices.

As introduced previously, a first step 302 in the exemplary additive manufacturing process involves programming the additive manufacturing machine 200 to control formation of a series of slices that, when fused together, will form an integral turbine blade. What differs, at least in part, from conventional programming is the fact that the machine 200 includes a beam splitter 214 that is controlled to divide a primary laser beam output from the laser 210 into multiple derivative laser beams. The orientation of the beam splitter 214 is operative to angularly offset the derivative laser beams from one another (in at least one of the X-direction or the Y-direction within an X-Y-Z three dimensional coordinate system), while at the same time direct the derivative laser beams concurrently to the same galvanometer 244 through a single entrance pupil 248. As will be described in more detail hereafter, angularly offsetting the derivative laser beams results in multiple laser beams being directed upon the powder bed 250 concurrently to fabricate multiple turbine blades from a single set of build instructions that, but for the beam splitter 214 and offsetting the derivative laser beams, would produce only a single turbine blade.

In addition to programming the additive manufacturing machine 200, the powder bed container 252 must be supplied with the requisite powder in step 304. Those skilled in the art will understand that this step 304 is not necessarily completed after the programming step 302, but rather needs to be performed at some time prior to initiation of the build sequence 306. Completion of this step 304 requires the requisite powder material (in this case a titanium alloy) used to construct the turbine blade (which is an exemplary device) be supplied and stored by the machine 200 in order to have sufficient powder material to construct the eventual product. It should be noted, however, that differing powders may be utilized as part of differing powder beds so as to construct the same structural features of a device from differing materials within differing powder beds. To the extent multiple powder beds are utilized, it is accordingly necessary to supply each powder bed with its own powder material. After supplying the powder material and programming the machine 200, the build sequence 308 can commence.

As an initial matter, the build sequence starts 308 by loading a product platform 260 onto the product piston (or multiple product platforms onto multiple product pistons in the case of multiple powder beds). The product platform 260 may be fabricated from various materials and sized to allow for sufficient cross-sectional area to fabricate the desired number of turbine blades concurrently. By way of example, the product platform 260 may have a rectangular cross-section and be fabricated from stainless steel. Nevertheless, platforms 260 having cross-sections other than rectangular and fabricated from materials other than stainless steel may be utilized in accordance with the instant disclosure.

After loading the product platform 260 into the machine 200, the machine controller initiates a powder deposition sequence 310 where the platform 260 is vertically lowered with respect to the surrounding walls 270 and the initial layer of titanium alloy powder is provided over the product platform 260 by the powder depositor and leveler 276. This initial powder layer may be thicker in depth than subsequent recharging layers, but nevertheless is provided in a uniform depth across the product platform 260.

In step 312, the machine master controller 208 initiates the initial beam scanning sequence 312 that includes instructions for controlling the laser 210, the beam splitter 214, the automatic dynamic focusing units 216-222, and the galvanometer 244 to create multiple, parallel initial sintered solid slices of multiple turbine blades. These instructions include powering on the laser 210 as if a single turbine blade slice was being fabricated. What differs from a conventional beam scanning sequence for forming a single device, at least in part, is the fact that the master controller 208 also controls the beam splitter 214 to take the output beam of the laser 210 and transform this single laser beam output into multiple, lesser power laser beams that are concurrently input to the galvanometer 244.

Each lesser power laser beam is directed to its own automatic dynamic focusing unit 216-222, which is angularly offset from one another. Consequently, the master controller 208 provides instructions to the laser 210 to selectively generate a beam to only melt certain portions of the powder material for a single slice based upon the shape of the desired slice to be fabricated, where these powering instructions are the same no matter how many parallel slices are fabricated (which is dependent upon the beam splitter 214 and the number of automatic dynamic focusing units). In addition, the initial beam scanning sequence 312 includes instructions for the galvanometer 244 to reposition its mirrors to change the position of the laser beams input thereto at the same time. The repositioning instructions and control of the galvanometer 244 is such that the instructions presume only a single laser beam is being redirected and a single slice is being fabricated, despite the fact that the multiple laser beams are input to the galvanometer and are reflected onto the powder bed to create simultaneous parallel patterns of fused material on the powder bed 250. In other words, but for the presence of the beam splitter 214 and the angular offset of the derivative laser beams, the control of the laser 210 and galvanometer 244 is the same as if the machine 200 was fabricating only a single turbine blade. Consequently, the initial beam scanning sequence 312 is simplified so that the directional changes of the galvanometer 244 controlled by the master controller 208 are only those changes in mirror position necessary to fabricate a single turbine blade slice.

By repositioning the galvanometer 244 across a smaller range of motion and, instead, creating multiple slices across the powder bed 250 from multiple laser beams being redirected in concert, the time necessary to reposition the laser beams is a fraction of the time otherwise necessary to reposition a single laser to create successive multiple slices across a powder bed. The fact that multiple turbine blade slices are created is the result of the beam splitter 214 and angularly offsetting of the derivative laser beams, which has no bearing on the galvanometer 244 control other than to necessarily reduce the range of motion of the galvanometer during creation of each slice, which necessarily reduces process times. In other words, the present disclosure obviates the need to have the galvanometer 244 reposition a single laser beam across the entire cross-section of the powder bed 250 necessary to fabricate multiple slices and, instead, only reposition its mirrors as if the a single part slice is being fabricated across a fraction of the powder bed. This simplified range of motion exhibited by the galvanometer 244 of the instant disclosure necessarily decreases production times and reduces the wear on the galvanometer motors.

After the master controller 208 completes the initial beam scanning sequence 312, representative of multiple initial slices being formed concurrently across the powder bed 250, the master controller initiates a piston repositioning sequence 314 where the piston and the product platform 260 are vertically repositioned downward within surrounding walls 270 of the powder bed container 252 a predetermined distance to create a cavity above the slices of fused titanium alloy. In a sequence 314, the vertical repositioning distance of the product platform 260 is approximately the same distance as the subsequent deposition layer depth of powdered titanium alloy to be deposited over the slices and across the powder bed 250 in a subsequent step. Exemplary vertical repositioning distances range between two to one hundred microns.

After the piston repositioning sequence 314, the master controller 208 initiates a powder replenishment sequence 316 where the initial slices of fused titanium alloy and the remainder of the powder bed 250 is overcoated with a powder layer of titanium alloy by the powder depositor and leveler 276. In an embodiment, this overcoating powder layer is evenly distributed and thick enough to completely cover the fused slices and to provide the desired thickness of fused material resulting from a subsequent laser beam scanning sequence 320. Exemplary powder overcoating thicknesses range between two to one hundred microns.

During the subsequent beam scanning sequence 320, the master controller 208 provides further instructions for controlling the laser 210, the beam splitter 214, the automatic dynamic focusing units 216-222, and the galvanometer 244 to create multiple, parallel solid slices of multiple turbine blades. As with the initial beam scanning sequence 312, the instructions for the subsequent beam scanning sequence 320 include powering on the laser 210 as if a single turbine blade slice was being fabricated. What differs from a conventional laser beam scanning sequence for forming a single device, at least in part, is the fact that the master controller 208 also controls the beam splitter 214 to take the output beam of the laser 210 and transform this single laser beam output into multiple, lesser power laser beams. Consequently, the laser 210 is selectively pulsed and the galvanometer 244 operates to reposition the derivative laser beams across the powder bed 250 in concert to form concurrent copies of the solid slice for each turbine blade.

Following the subsequent beam scanning sequence 320, the master controller 208 initiates a piston repositioning sequence 322 followed by a powder replenishment sequence 324 where the subsequent slices of fused titanium alloy and the remainder of the powder bed 250 is overcoated with a powder layer of titanium alloy by the powder depositor and leveler 276. In an embodiment, this overcoating powder layer is evenly distributed and thick enough to completely cover the fused slices and to provide the desired thickness of fused material resulting from repetition of the subsequent laser beam scanning sequence 320. In other words, after the powder replenishment sequence 324, the machine performs steps 320, 322, and 324 in sequence, repetitively, to form all of the required slices from the second slice through the n−1 slice, where "n" represents to total number of slices necessary to fabricate a completed part (in this case, a turbine blade).

When the machine 200 sequence 300 reaches the final or "nth" slice, the machine sequence moves on to step 326, the final slice scanning sequence. During the final slice scanning sequence 324, the master controller 208 provides instructions for controlling the laser 210, the beam splitter 214, the automatic dynamic focusing units 216-222, and the galvanometer 244 to create a series of final, multiple, parallel solid slices of multiple turbine blades. As with the other scanning sequences 312, 320, the instructions for the final slice scanning sequence 324 include powering on the laser 210 to form the final slice, followed by instructions to shut down the laser after the final slices are completed. In addition, the beam splitter 214 and the automatic dynamic focusing units 216-222 are also powered down after the final slices are completed.

When the final slice scanning sequence 324 is completed, the machine 200 initiates a product exposure process 330 where direct contact with the finished turbine blades 262-268 is available to an operator of the machine. In exemplary form, the machine 200 directs the platform piston to raise the product platform 260 slowly in combination with initiation of a vacuum operation to remove powdered material (in this case powder titanium alloy) from the powdered bed 250, thereby leaving behind a series of identical turbine blades (in this case, four turbine blades) 262-268 sitting atop the product platform. The turbine blades 262-268 may be removed manually or automatically from the machine and subjected to optional finished processing that may include application of a coating and/or heat treatment.

Removal of the finished products (e.g., turbine blades) 262-268 from the machine 200 combined with removal of the residual powder material results in the build platform 260 being free of powder or any surface materials and vertically elevated by the build piston to be flush with the surrounding walls 270 of the powdered bed container 252. When reaching this point, the machine 200 may revert to step 310 to initiate a powder deposition sequence, presuming more turbine blades of the exact shape and dimensions will be fabricated. Otherwise, in cases where the build instructions have been changed, the machine may start with the first step 302 to program in the build instructions for a different device.

Alternatively, or in addition, it is also within the scope of the disclosure to use multiple lasers to generate multiple laser beams that directed to the galvanometer 244. Accordingly, there is no limit to the number of lasers that can be utilized in accordance with the present disclosure. Moreover, one may omit the beam splitter 214 and instead utilize multiple lasers that emit a beam being angularly offset from one another. By utilizing multiple lasers, one may be able to more precisely control the melting of differing powder materials across multiple powder beds to the extent multiple powder beds containing differing powder materials are utilized.

While the foregoing exemplary embodiment has been described as using a single laser 210 and a beam splitter 214 to provide four equal power derivative laser beams, it should be understood that a beam splitter operative to provide more or less than four equal power derivative laser beams may be utilized. Moreover, the beam splitter 214 need not create derivative laser beams having the same intensity/power. Rather, it is within the scope of the disclosure to utilize a beam splitter operative to provide derivative laser beams having differing intensities/powers. Consequently, there is no limit to the configuration of a beam splitter that can be utilized in accordance with the present disclosure.

While the foregoing exemplary embodiment has been described in terms of a single laser outputting a single beam that is thereafter divided into lesser power beams, it is also within the scope of the disclosure to utilize multiple stand-alone lasers (i.e., two or more) that may substitute for one or more of the divided, lesser power laser beams discussed previously. In exemplary form, in lieu of using four divided laser beams of 250 Watts each, one may use four stand-alone lasers each outputting a laser beam at approximately 250 Watts. It should be understood that lasers outputting beams greater than or less than 250 Watts may be utilized. Moreover, by using different lasers, one may independently and dynamically control the focus and power of each output laser beam (e.g., to compensate for a slightly different laser beam spot size at different locations on the build platform).

While the foregoing exemplary embodiment has been described as using a titanium alloy powder that is reapplied multiple times to form successive slices and, ultimately, multiple copies of a finished turbine blade 262-268, it is also within the scope of the disclosure to apply solid powders of differing materials. Accordingly, during a powder replenishment sequence 316, 324, a solid powder may be applied that differs from the previous solid powder layer that was sintered. In this fashion, three dimensional objects may be fabricated from multiple layers of differing materials or an alloy having the same components but having a different composition percentage for at least one of the constituent components.

It is also within the scope of the disclosure to form a slice using different solid powders. In this manner, differing solid powders may be selectively applied across a prior sintered, solid slice so that future sintering will result in melting of differing solid powers that will become fused together during a laser beam scanning sequence to form a composite solid slice. Those skilled in the art will be familiar with executing this variation in view of the foregoing disclosure and, hence, a detailed explanation of this variation is unnecessary and has been omitted in furtherance of brevity.

Following from the above description and disclosure summaries, it should be apparent to those of ordinary skill in the art that, while the methods and apparatuses herein described constitute exemplary embodiments of the present disclosure, it is to be understood that the embodiments contained herein are not limited to the above precise embodiment and that changes may be made without departing from the scope of the disclosure as defined by the claims. Likewise, it is to be understood that it is not necessary to meet any or all of the identified advantages or objects of the disclosure in order to fall within the scope of the disclosure, since inherent and/or unforeseen advantages of the present disclosure may exist even though they may not have been explicitly discussed herein.

What is claimed is:

1. A method of creating an article of manufacture, the method comprising:
    (a) directing multiple laser beams to a single entrance pupil of a single galvanometer, each of the multiple laser beams having a different angle from the other laser beams;
    (b) controlling the single galvanometer to concurrently and proportionally reposition each of the laser beams to a different location within a container housing a first powder material to melt at least a portion of the first powder material;
    (c) applying additional first powder material to a location where the first powder material was previously melted;
    (d) controlling the single galvanometer to concurrently and proportionally reposition each of the laser beams to a different location within the container housing the additional first powder material to melt at least a portion of the additional first powder material; and
    (e) repeating steps (c) and (d) sequentially to form multiple three dimensional objects.

2. The method of claim 1, wherein the act of directing multiple laser beams to the single galvanometer includes splitting a primary laser beam into the multiple laser beams.

3. The method of claim 2, wherein the act of splitting of the primary laser beam includes creating the multiple laser beams each having the same power.

4. The method of claim 1, wherein the primary laser beam comprises a 1000 Watt or greater laser beam.

5. The method of claim 1, wherein a solid state laser is utilized to generate the multiple laser beams.

6. The method of claim 5, wherein the multiple laser beams are transmitted via a fiber optic.

7. The method of claim 1, wherein delivering each of the multiple laser beams to the single galvanometer includes offsetting the multiple laser beams relative to each other within at least two dimensions of a three dimensional space prior to reaching the single galvanometer.

8. The method of claim 1, wherein delivering each of the multiple laser beams to the single galvanometer includes expanding each of the multiple laser beams downstream from a laser source but prior to reaching the single galvanometer.

9. The method of claim 1, wherein delivering each of the multiple laser beams to the single galvanometer includes automatically dynamically focusing each of the multiple laser beams prior to reaching the single galvanometer.

10. The method of claim 1, wherein the step of controlling the single galvanometer includes concurrently and proportionally dynamically repositioning each of the multiple laser beams within a two-dimensional coordinate system to melt the first powder material to form duplicate solid slices for each of the three dimensional objects within a single powder bed.

11. The method of claim 1, wherein the step of applying additional first powder material includes applying a layer of additional first powder material to locations where the first powder material was immediately prior melted.

12. The method of claim 1, further comprising:
    (f) applying a second powder material above where the first powder material was previously melted;
    (g) controlling the single galvanometer to concurrently and proportionally reposition each of the multiple laser beams to a unique location within the container housing the second powder material to melt at least a portion of the second powder material; and
    (h) repeating at least one of steps (c) and (d) and steps (f) and (g) sequentially to form multiple copies of an advanced three dimensional object that was formed from the first powder material and the second powder material.

13. A method of creating an article of manufacture, the method comprising:
    (a) directing multiple laser beams to a single entrance pupil of a single galvanometer, each of the multiple laser beams having a different angle from the other laser beams;
    (b) controlling the single galvanometer to concurrently and proportionally dynamically reposition each of the multiple laser beams within an X-Y coordinate system to shine on and melt a first powder material on a working surface to ultimately create a first solid slice of a three dimensional object, where each of the multiple laser beams is operative to create a duplicate of the first solid slice within a single powder bed;
    (c) applying additional first powder material to each first solid slice;

(d) controlling the single galvanometer to concurrently and proportionally dynamically reposition each of the multiple laser beams within the X-Y coordinate system to shine on and melt at least a portion of the additional first powder material to create a further solid slice of the three dimensional object that is attached to the first solid slice, where each of the multiple laser beams is operative to create a duplicate of the further solid slice;

(e) applying additional first powder material to the further solid slice;

(f) controlling the single galvanometer to concurrently and proportionally dynamically reposition each of the multiple laser beams within the X-Y coordinate system to shine on and melt at least a portion of the additional first powder material to create another solid slice of the three dimensional object that is attached to a preceding solid slice, where each of the multiple laser beams is operative to create a duplicate of the another solid slice; and, (g) repeating steps (e) and (f) sequentially to form the three dimensional object, where each of the multiple laser beams is operative to create a duplicate of the three dimensional object when all solid surfaces of the three dimensional object have been completed.

14. The method of claim 13, wherein the act of directing multiple laser beams to the single galvanometer includes splitting a primary laser beam into the multiple laser beams.

15. The method of claim 14, wherein splitting of the primary laser beam includes creating the multiple laser beams that each have the same power.

16. The method of claim 14, wherein the primary laser beam comprises a 1000 Watt or greater laser beam.

17. The method of claim 14, wherein the primary laser beam is generated by a solid state laser.

18. The method of claim 17, wherein the primary laser beam generated by the solid state laser is transmitted via a fiber optic.

19. The method of claim 13, wherein delivering each of the multiple laser beams to the single galvanometer includes offsetting the multiple laser beams relative to each other within at least two dimensions of a three dimensional space prior to reaching the single galvanometer.

20. The method of claim 13, wherein delivering each of the multiple laser beams to the single galvanometer includes expanding each of the multiple laser beams downstream from a laser source but prior to reaching the single galvanometer.

21. The method of claim 13, wherein delivering each of the multiple laser beams to the single galvanometer includes automatically dynamically focusing each of the multiple laser beams prior to reaching the single galvanometer.

22. The method of claim 13, further comprising:
(h) applying a second powder material above where the first powder material was previously melted;
(i) controlling the single galvanometer to concurrently and proportionally reposition each of the multiple laser beams to a unique location within a container housing the second powder material to melt at least a portion of the second powder material; and
(j) repeating at least one of steps (f) and (g) and steps (h) and (i) sequentially to form multiple copies of an advanced three dimensional object that was formed from the first powder material and the second powder material.

23. The method of claim 13, wherein:
step (c) also includes solidification of the first powder material after the multiple laser beams melt the first powder material, where solidification of melted first powder material forms the first solid slice; and,
step (e) also includes solidification of the additional first powder material after the multiple laser beams melt the additional first powder material, where solidification of melted additional first powder material forms the further solid slice.

24. The method of claim 13, wherein the step (f) includes applying a layer of additional first powder material to the further solid slice.

25. A method of creating an article of manufacture, the method comprising:
(a) directing multiple laser beams to a single entrance pupil of a single galvanometer, each of the multiple laser beams having a different angle from the other laser beams;
(b) concurrently and proportionally dynamically repositioning the multiple laser beams using a single galvanometer to melt a first powder material in duplicate patterns of a first slice of a three dimensional object, where each of the multiple laser beams is responsible for at least one of the duplicate patterns;
(c) solidification of the melted powder material to form a plurality of first solid slices that are duplicates of one another;
(d) delivering additional first powder material on top of the plurality of first solid slices;
(e) concurrently and proportionally dynamically repositioning each of the multiple laser beams using the single galvanometer to melt at least a portion of the additional first powder material in duplicate patterns of a further slice of the three dimensional object, where each of the multiple laser beams is responsible for at least one of the duplicate patterns;
(f) solidification of the melted additional first powder material to form a plurality of further solid slices that are duplicates of one another; and,
(g) repeating steps (d) through (f), sequentially, unless the plurality of further solid slices represent a final slice of the three dimensional object.

26. The method of claim 25, wherein the act of directing multiple laser beams to the single galvanometer includes dividing a primary laser beam into the multiple laser beams.

27. The method of claim 26, wherein dividing of the laser beam includes creating lower power laser beams that each have the same power.

28. The method of claim 26, wherein the primary laser beam comprises a 1000 Watt or greater laser beam.

29. The method of claim 26, wherein the primary laser beam is generated by a solid state laser.

30. The method of claim 26, wherein the primary laser beam generated by the solid state laser is transmitted via a fiber optic.

31. The method of claim 25, further comprising delivering each of the multiple laser beams to the single galvanometer by offsetting the multiple laser beams relative to each other within at least two dimensions of a three dimensional space prior to reaching the single galvanometer.

32. The method of claim 31, wherein delivering each of the multiple laser beams to the single galvanometer includes expanding each of the multiple laser beams downstream from a laser source but prior to reaching the single galvanometer.

33. The method of claim 31, wherein delivering each of the multiple laser beams to the single galvanometer includes automatically dynamically focusing each of the multiple laser beams prior to reaching the single galvanometer.

34. The method of claim 25, further comprising:
(h) applying a second powder material above where the first powder material was previously melted;
(i) controlling the single galvanometer to concurrently and proportionally reposition each of the multiple laser beams to a unique location within a container housing the second powder material to melt at least a portion of the second powder material;
(j) solidification of the melted second powder material to form a plurality of second material solid slices that are duplicates of one another; and,
(k) repeating at least one of steps (d) through (f) and steps (h) through (j) sequentially to form multiple copies of an advanced three dimensional object that was formed from the first powder material and the second powder material.

35. A method of creating an article of manufacture, the method comprising:
(a) directing multiple laser beams to a single entrance pupil of a single galvanometer, each of the multiple laser beams having a different angle from the other laser beams; and
(b) dynamically repositioning the multiple laser beams in counterpart paths using the single galvanometer to shine the multiple laser beams on and melt a first powder material and, upon solidification of the melted first powder material, forming a first series of duplicate three dimensional structures, where each of the multiple laser beams is used to form at least one of the first series of duplicate three dimensional structures.

36. The method of claim 35, wherein the act of directing multiple laser beams to the single galvanometer includes dividing a primary laser beam into the multiple laser beams.

37. The method of claim 35, further comprising repeating step (b) to form a series of three dimensional structures mounted to one another to form multiple, separate three dimensional end products, where each of the multiple laser beams is used to create one of the multiple, separate three dimensional structures.

38. The method of claim 37, further comprising the step of delivering additional powder material over the duplicate three dimensional structures prior to repeating step (b).

39. The method of claim 35, wherein the powder material is housed in separate containers, one container for each of the multiple laser beams.

40. The method of claim 39, wherein the powder material housed within at least two of the separate containers is different.

41. The method of claim 36, wherein dividing of the primary laser beam includes creating the multiple laser beams that each have the same power.

42. The method of claim 36, wherein the primary laser beam comprises a 1000 Watt or greater laser beam.

43. The method of claim 36, wherein the primary laser beam is generated by a solid state laser.

44. The method of claim 43, wherein the primary laser beam generated by the solid state laser is transmitted via a fiber optic.

45. The method of claim 35, further comprising delivering each of the multiple laser beams to the single galvanometer by offsetting the multiple laser beams relative to each other within at least two dimensions of a three dimensional space prior to reaching the single galvanometer.

46. The method of claim 45, wherein delivering each of the multiple laser beams to the single galvanometer includes expanding each of the multiple laser beams downstream from a laser source but prior to reaching the single galvanometer.

47. The method of claim 45, wherein delivering each of the multiple laser beams to the single galvanometer includes automatically dynamically focusing each of the multiple laser beams prior to reaching the single galvanometer.

48. The method of claim 35, further comprising:
(c) dynamically repositioning the multiple laser beams in counterpart paths using the single galvanometer to shine the multiple laser beams on and melt a second powder material on top of the melted first powder material, upon solidification of the melted second powder material, forming a second series of three dimensional structures, where each of the multiple laser beams is used to form at least one of the second series of three dimensional structures, where the melted first powder material is mounted to the melted second powder material.

* * * * *